2,624,541

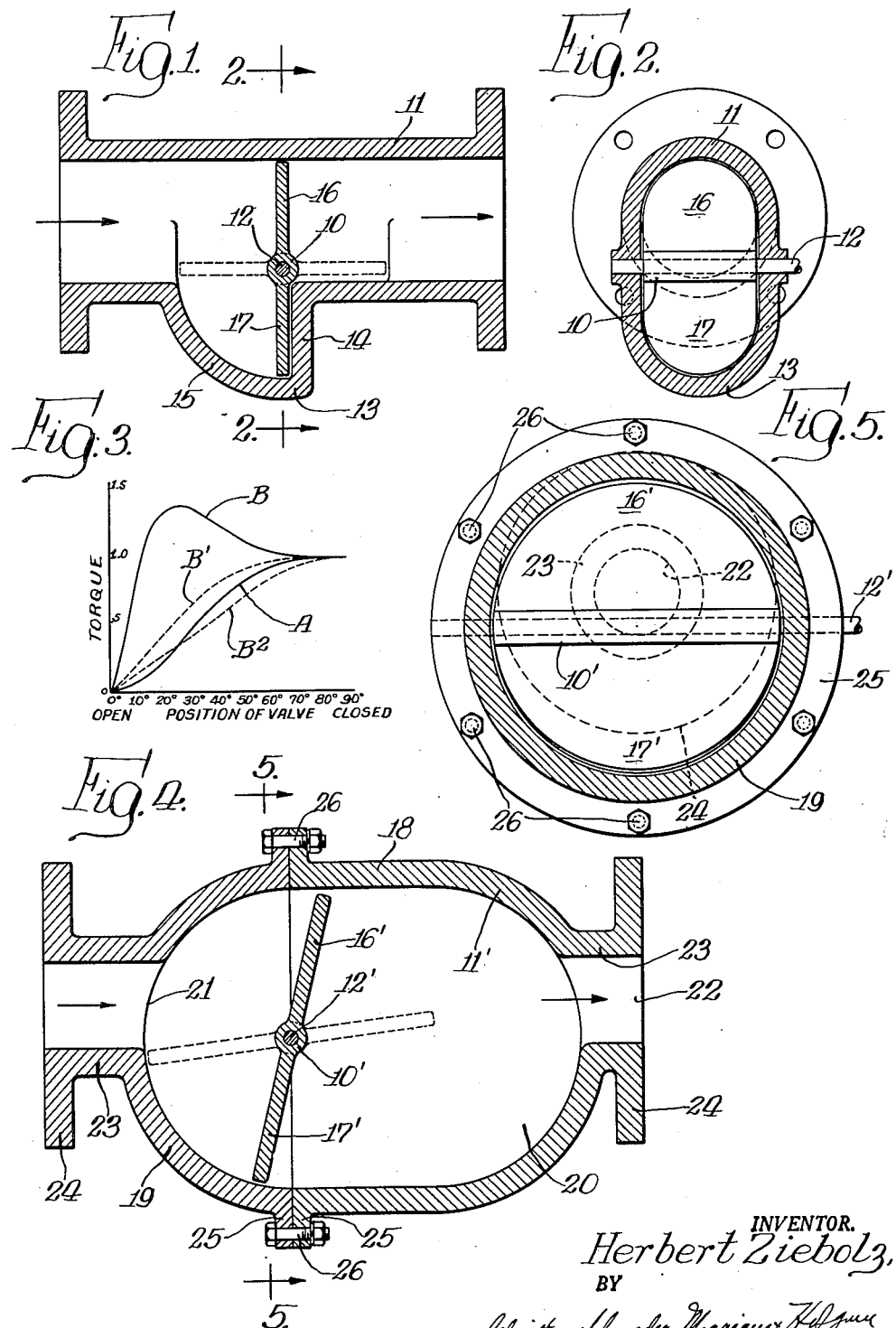
Jan. 6, 1953 — H. ZIEBOLZ — 2,624,541
BUTTERFLY VALVE
Filed Nov. 29, 1946
INVENTOR.
Herbert Ziebolz Patented Jan. 6, 1953

UNITED STATES PATENT OFFICE 2,624,541

BUTTERFLY VALVE

Herbert Ziebolz, Chicago, Ill., assignor to Askania Regulator Company, Chicago, Ill., a corporation of Illinois Application November 29, 1946, Serial No. 712,751

8 Claims. (Cl. 251—11)

1

The invention relates generally to valves of the pivoted vane type and more particularly to symmetrical vane type valves commonly known as butterfly valves.

All butterfly valves when in other than full open position and subjected only to the forces created by the fluid in the conduit controlled by the valve have a tendency to close. This tendency, moreover, is a nonuniform one vary from zero at the full open and full closed positions of the valve to a comparatively high value at an intermediate point. As a result, accurate positioning of a butterfly valve is difficult because the power required to move the valve to or hold the valve in position varies with the position of the valve.

Various constructions have been devised in an attempt to overcome this difficulty. For the most part, these constructions have involved changes in the design of the valve itself and thus, even though accomplishing the desired end, have resulted in valves difficult to manufacture, expensive and frequently also subject to injury or requiring frequent attention or adjustment. It is an object of this invention, therefore, to provide butterfly valve means of new and improved construction wherein the torque tending to close the valve is made more uniform throughout the range of valve positions, while the valve per se remains a simple symmetrical and conventional butterfly valve.

A further object of the invention is to provide butterfly valve means in which the forces tending to open and close the valve are made substantially uniform so as to approach a balanced valve condition while the valve per se remains a simple symmetrical and conventional butterfly valve.

Another object is to provide butterfly valve means in which approximately only one-half of the valve is employed for control purposes while the other half is employed to balance and offset the force of the fluid being controlled acting on the half serving the control function.

Other objects and advantages will become apparent from the following detailed description taken in connection with the accompanying drawings, in which:

Fig. 1 is a diametrical sectional view taken perpendicular to the axis of the valve of a butterfly valve means embodying the features of my invention.

Fig. 2 is a transverse sectional view taken approximately along the line 2—2 of Fig. 1.

Fig. 3 is a graph illustrating the various torques acting on a butterfly valve.

Fig. 4 is a sectional view taken on a diameter perpendicular to the axis of the valve of a slightly modified form of butterfly valve means embodying my invention.

Fig. 5 is a transverse sectional view taken approximately along the line 2—2 of Fig. 4.

2

While the invention is susceptible of various modifications and alternative constructions, it is shown in the drawing and will hereinafter be described in a basic embodiment and a more commercial embodiment. It is not intended, however, that the invention is to be limited to the specific constructions shown. On the contrary it is intended to cover all modifications and alternative constructions falling within the spirit and scope of the invention as defined by the appended claims.

Referring first to the form of the invention shown in Figs. 1 and 2, the valve means comprises a vane 10 which herein is generally oblong to adapt it for use with a conduit or conduit section 11 which is for the most part cylindrical, though obviously it might take other shapes to adapt it for use with a conduit having other than a circular cross sectional area. It is also shown oblong because that is one of the most conventional forms, is readily manufactured and is readily made symmetrical, it being a feature of this invention that the valve per se, that is, the vane 10, does not depart from a conventional symmetrical and thus readily manufactured vane. The vane 10 is fast on a shaft 12 which extends diametrically of the vane and is intended to be journaled in the conduit or conduit section 11 with at least one end of the shaft 12 projecting outwardly of the conduit for engagement by suitable external actuating means.

As is well known to those skilled in the art, the fluid controlled by the vane acts on the vane and creates forces tending to rotate the vane in opposite directions. In a conventional installation, that is, with the axis of the vane coinciding with the diameter of the conduit when circular, or with the center line of the conduit when having other than a circular shape, the torque tending to close the valve exceeds the torque tending to open the valve. More particularly, the fluid acting on that half of a vane which moves generally in the direction of fluid flow as the valve opens generates a torque which is represented by the curve A of Fig. 3, the conventional butterfly valve having an opening torque of zero value when the vane is in full open position and a value represented as 1 in Fig. 3 when the vane is in full closed position. As seen from Fig. 3, the value of the torque increases rather gradually, approximating the value of 1 when the vane is at about 65° from full open position. The torque developed by the fluid acting on the other half of a conventionally constructed and mounted butterfly valve, that is, the half which moves counter to the direction of fluid flow as the valve is opened is represented by the curve B in Fig. 3 and is, of course, a torque tending to rotate the vane to closed position. In conventional butterfly valves, this torque also is zero when the vane is in full open position and has a value of 1 when the vane is in full closed position, so that in these two extreme positions there is no resultant torque tending to rotate the vane. It is known, however, and is readily seen from Fig. 3, that the torque generated by the fluid acting on this half of the valve of the vane rises very rapidly and to a high value as the vane is swung from full open position toward closed position with the maximum value being reached when the vane is approximately 23° away from full open position. From this maximum value the torque then decreases to reach its ultimate value of 1 as the vane swings progressively toward closed position. It will be seen from a glance at curves A and B that not only does the torque represented by the curve B exceed that represented by the curve A, so as to have a resultant closing torque, but this resultant torque is a variable, nonuniform torque.

It is a feature of this invention to provide a construction, while retaining a simple conventional and symmetrical vane 10, at least to retain more uniform the resultant torque which tends to rotate the vane 10 to closed position and preferably to cause the opposing individual torques to have similar values resulting in a butterfly valve which is balanced in all angular positions. To that end the valve means is so constructed that approximately one-half thereof only acts to control the flow of fluid while the other half acts to counteract or offset the torque generated by the fluid acting on the first mentioned half. Herein this is accomplished by forming the conduit 11 with a blister 13 formed on one-half of the conduit 11. In transverse cross section, that is, as seen in Fig. 2, the blister has an approximately semicircular shape and has, as best seen in Fig. 1, a radial wall 14 and a spherical wall 15. The blister has its radially disposed wall 14 facing upstream, that is, so that the lateral projection of the blister increases in a downstream direction. The vane 10 which, as above stated, is generally oval in shape is journaled with its axis just slightly radially inwardly of the inner wall of that side of the conduit having the blister formed therein and also just slightly upstream of the plane in which the radial wall 14 of blister 13 lies. The vane 10 has a major dimension of such length that the one edge just clears the inner wall of the conduit 11 when the vane is swung to a full closed position and so that the other edge clears the spherical wall 15 of the blister.

If it be assumed that the flow of fluid through the conduit 11 is in the direction of the arrows of Fig. 1, that is, from left to right, the action of the fluid on the controlling half of the vane 10, that is, the upper half as viewed in Fig. 1, and which will hereinafter be designated by the reference character 16, will create a torque tending to rotate the vane in a clockwise direction, that is, toward open position. Since the position of the controlling half 16 of the vane is no different with respect to the fluid flow from its position in a conventional butterfly valve arrangement, the torque thus generated will still be represented by the curve A of Fig. 3. With the counterbalancing half of the vane 10, that is, the lower half 17 as viewed in Fig. 1, disposed in the blister 13 save when the vane is in full open position, the position which this counterbalancing half of the vane occupies relative to the fluid stream is materially different from that of a conventional butterfly valve construction and thus the torque generated by the fluid acting on this counterbalancing half of the vane no longer is represented by the curve B of Fig. 3. On the contrary, it was found that this recession of the counterbalancing half 17 of the vane into the blister 13 resulted in a torque falling between the curves B' and B². Thus it will be seen that the torque generated by the fluid acting on the counterbalancing half 17 of the vane very closely approximates the torque represented by the curve A and generated by the fluid acting on the controlling half 16 of the vane. As a consequence a more nearly uniform resultant torque is obtained and there results a butterfly valve which is substantially balanced in all angular positions.

Turning now to Figs. 4 and 5, there is disclosed therein a butterfly valve means constructed on the principle of the valve means disclosed in Figs. 1 and 2 but in a form more suitable and more practical for commercial use. Comprising this form is a vane 10' rigid on a shaft 12' which is rotatably journaled in a conduit or conduit section 11'. In this form, the conduit 11' instead of having a protrusion such as the blister 13, which is difficult to make and which construction necessitates the employment of an oblong vane 10, is formed with a cylindrical intermediate portion 18 and with end portions 19 and 20 which in the main are semispherical. With this construction the vane 10' can be circular and mounted with the shaft 12 on a diameter of the cylindrical portion 18. In order that one half 16' of the vane 10' may act as the controlling half while the remaining half 17' may act as the counterbalancing half, the conduit section 11' is formed with an inlet 21 and with an outlet 22 offset radially from the axis of the cylindrical portion 18. It will be understood and appreciated, of course, that this offset of the inlet and outlet must be in a direction perpendicular to the shaft 12' on which the vane 10' is mounted and in the direction of extension of the controlling half 16' of the vane when the latter is in full closed position.

Preferably short neck portions 23 are provided at the openings which neck portions terminate in radial flanges 24 by means of which the conduit section 11' may be connected into the main conduit. The portions 18, 19 and 20 may all be formed as separate parts, or one of the semispherical portions may be formed as an integral part with the cylindrical portion 18 while the other is formed as a separate part to permit incorporation of the vane 10' in the conduit section 11'. Preferably the portions 18 and 19 are formed separately and are provided with radial flanges 25 enabling the portions to be secured together as by bolts 26 passing through the flanges.

The operation of this embodiment of the invention is, of course, the same as that disclosed in Figs. 1 and 2. Suffice it to say, therefore, that the half 16' of the vane 10' acts as the control half while the half 17' having the peak in its own torque taken out acts to compensate for and offset the torque of the half 16'.

I claim as my invention:

1. A pivoted vane type valve comprising a tubular housing having ends of gradually reduced cross section and openings in the ends in longitudinal alignment with one another but offset with respect to the longitudinal center line of said housing, a symmetrical vane mounted within said housing on an axis intersecting the longitudinal center line of said housing and extending transversely of said housing and at right angles to the direction of offset of the openings in the ends of said housing relative to the center line thereof, and a rockable shaft upon which said vane is fixed journaled in said housing.

2. A pivoted vane type valve comprising a housing having a cylindrical intermediate section and semispherical end sections each having an opening formed therein in longitudinal alignment and offset laterally relative to the center line of said cylindrical section, a circular vane mounted within said housing on an axis coinciding with a diameter of said cylindrical section which is perpendicular to the direction of offset of said openings, and a rockable shaft upon which said vane is fixed journaled in said housing to provide the axis for said vane.

3. A pivoted vane type valve comprising a housing having a first part consisting of a cylindrical portion and an end portion of progressively reduced cross section with an outlet opening formed therein offset from the center line of said cylindrical portion, and a second part adapted to be secured to said first part, said second part being semispherical with an opening therein offset from the center line of said cylindrical portion to lie in longitudinal alignment with said first mentioned opening, a circular vane pivotally mounted within the housing on an axis coinciding with a diameter of said cylindrical portion which is at right angles to the direction of offset of the openings, and a shaft forming the axis about which said vane pivots journaled in said housing at the joint formed by the parts of said housing.

4. A pivoted vane type valve comprising a housing having only one inlet opening thereto and one outlet opening thereto with said inlet and outlet being axially aligned, a symmetrical vane mounted within said housing, a rockable shaft journaled in said housing and having said vane mounted thereon for pivotal movement about the axis of said shaft, said vane having one portion thereof on one side of said shaft disposed for movement primarily within the path of fluid flow from said inlet to said outlet, the other portion of said vane on the other side of said shaft being positioned for movement primarily out of said flow path from said inlet to said outlet, said housing having a portion on the upstream side of the vane with a shape generally described by the periphery of said other portion of the vane in moving from fully closed to fully open position, and said shaft being positioned on the side of said path of direct flow from said inlet to said outlet adjacent said portion of the housing whereby the fluid pressure on said vane as a whole produces a torque which is substantially in balance about said shaft when said vane is positioned as specified.

5. A pivoted vane type valve comprising means forming a housing having a pair of openings in axial alignment for straight line flow therethrough of a fluid to be controlled, a vane symmetrical with respect to its own axis mounted within the housing, and a rockable shaft upon which said vane is fixed journaled in said housing, said vane being offset laterally relative to the fluid stream so as to position a first portion of the vane lying on one side of said shaft primarily in the path of fluid flow and to position a second portion of the vane lying on the other side of said shaft primarily out of the path of fluid flow, said housing having a portion on the upstream side of the vane with a shape generally described by the periphery of said second portion of the vane in moving from fully closed to fully open position.

6. A pivoted vane type valve comprising means forming a housing having a pair of openings in axial alignment for straight line flow therethrough of a fluid to be controlled, said housing having a portion offset with respect to the center line of the openings in the ends of the housing, a vane symmetrical with respect to its axis mounted within said housing, and a rockable shaft on which said vane is fixed journaled in said housing, a portion of said housing on the upstream side of the vane having a shape generally described by the periphery of a major portion of the vane on one side of the shaft in moving from fully closed to fully open position and said vane being offset laterally relative to the fluid stream and in the direction of the offset portion of the housing so as to position approximately one-half of the vane in the offset portion and to position the other half of the vane primarily in the path of fluid flow through the housing when the vane is in fully closed position, with said other half of the vane moving counter to the direction of fluid flow when the vane is pivoted toward closed position.

7. A pivoted vane type valve comprising a generally cylindrical housing having an inlet and an outlet for fluid flow therebetween and having a blister portion composed of a radial wall on the downstream side and a wall generally in the shape of a quarter section of a sphere, a symmetrical vane within said housing, a shaft upon which said vane is fixed journaled in said housing and extending transverse to the direction of fluid flow between the inlet and the outlet, with its axis perpendicular to the line extending across the major transverse dimension of said housing and blister and located just upstream of the radial wall of said blister and slightly radially inwardly of the intersection of the radial wall of said blister and said cylindrical housing.

8. The valve of claim 7 in which said vane is oblong in shape and mounted within the housing to pivot about its minor axis with its major axis perpendicular to said line extending across the major transverse dimension of said housing and blister when said vane is in fully open position and in which substantially all of one-half of said vane is received within said blister and lies parallel with and adjacent to said radial wall when said vane is in fully closed position.

HERBERT ZIEBOLZ.

REFERENCES CITED

The following references are of record in the file of this patent:

UNITED STATES PATENTS

| Number | Name | Date |
|---|---|---|
| 373,848 | Pearsall | Nov. 29, 1887 |
| 616,252 | Pennie | Dec. 20, 1898 |
| 808,397 | Meakin | Dec. 29, 1905 |
| 904,497 | Cowdrey | Nov. 17, 1908 |
| 1,173,484 | Clay | Feb. 29, 1916 |
| 1,239,391 | Henry | Sept. 4, 1917 |
| 1,528,479 | Hansen | Mar. 3, 1925 |
| 1,613,897 | Lichty | Jan. 11, 1927 |
| 1,973,842 | Broderick | Sept. 18, 1934 |
| 2,358,260 | Simpson | Sept. 12, 1944 |

FOREIGN PATENTS

| Number | Country | Date |
|---|---|---|
| 59,987 | Switzerland | May 1912 |